April 21, 1953     F. H. HEHEMANN     2,635,482
VALVE HANDLE
Filed April 14, 1951

INVENTOR.
Frederick H. Hehemann.
BY
Wood, Herron & Evans.
ATTORNEYS.

Patented Apr. 21, 1953

2,635,482

UNITED STATES PATENT OFFICE 2,635,482

VALVE HANDLE

Frederick H. Hehemann, Cincinnati, Ohio, assignor to The Lunkenheimer Company, Cincinnati, Ohio, a corporation of Ohio Application April 14, 1951, Serial No. 221,035

3 Claims. (Cl. 74—553)

This invention relates to an improved handle by which valves and similar control devices may be operated. The invention is directed particularly to an improved handle capable of facilitating positive operation of a steam valve or the like through which the flow of a hot fluid medium is controlled.

The typical steam valve consists of a metal body having a valve element which is moved to open, closed or intermediate positions by means of a rotatable stem having an operating handle at its upper end which may be grasped and turned by hand. Since the metallic stem of the valve is in intimate contact with the body, and since the inner end of the stem, which carries the movable valve element is exposed directly to the temperature of the hot steam or other medium passing through the valve, the stem assumes substantially the same temperature as that of the medium itself. The handle of the valve is in metal to metal driving connection with the stem, and therefore, it, too, becomes hot to touch by heat conduction through the metal parts. Sometimes the valve handle is of perforated or filigree configuration, but, when the valve is installed in an area where the temperature of the surrounding air is high as is frequently the case, the valve handle is not cooled by radiation from the exposed surfaces as might otherwise be expected.

Ordinarily, the stem of the valve is not freely rotatable but is frictionally restrained against rotation by packing interposed in fluid-tight relation between the body and the stem. Actually, most valves become even still harder to operate after they have been in use for any period of time, because of dirt accumulations or because the packing may tend to stick to the stem at the elevated surface temperature. Also, when a closed valve is to be opened, a relatively high initial torque may be required to overcome the surface friction between the engaged movable and stationary elements of a valve, as is common experience.

In these circumstances, the fact that the valve handle is hot to the touch poses a constant problem to the workman or the operating engineer who must manipulate the valve from time to time in the performance of his duties. A valve handle must be grasped firmly in order that the necessary twist or torque may be exerted on the stem, yet the more tightly the workman holds the handle, the more intimate is his contact with the hot metal of the handle, and therefore, the harder he holds the handle the more he is likely to be burned by the hot metal.

When a workman is forewarned that a valve handle which he must operate is hot to the touch, it is logical to assume that he will protect himself with gloves. This is the practice in some plants, but even so, in typical plant operation it is found that the gloves soon become greasy and, through looseness and slippage, do not afford the grip that is required to effect the operation of the handle.

In partial recognition of these difficulties, valve handles have been proposed comprising one or more simple cross bars extending laterally from the stem. Handles of this type afford positive grip, but their use has been discarded for the reason that their configuration virtually constitutes an open invitation to the workman to operate them by means of a cool wrench rather than by manual manipulation as intended. The torque exerted by a monkey wrench placed across the handles is likely to be so much greater than the force that the stem was designed to withstand that the handle is twisted from the stem or the stem is twisted off and the valve must be repaired. Practical experience has indicated that T-shaped handles are actually dangerous to install, since the engineer may find it imperative to operate a valve only to discover that its T handle or stem was previously damaged and not since repaired.

Because such difficulties constitute a daily nuisance in all sorts of plants throughout the country, the principal objective of this invention has been to provide a handle which, though hot, may still be operated conveniently in a positive and direct manner with minimum danger of burning the operator and with maximum facility even when the hands of the workman are greasy. Further, many valves are intended for either hot or cold service, and, in this respect, an objective of the invention has been to provide a valve handle which may be adopted as standard equipment on valves for either type of service.

A typical embodiment of a valve handle of the present invention, capable of meeting the objectives which have been discussed, as illustrated in the accompanying drawings in which.

Figure 1:
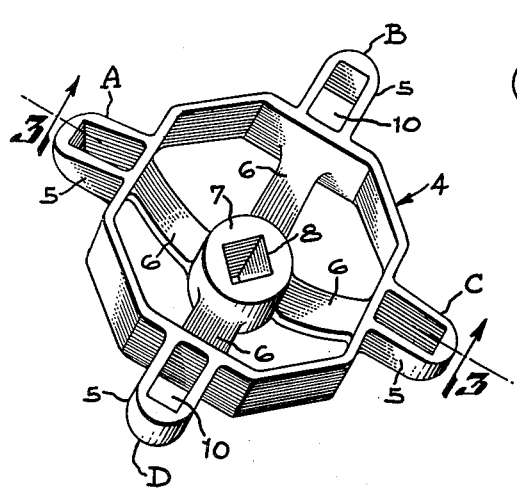
Figure 1 is a perspective view of the handle of the present invention, looking principally at its top.
Figure 2:
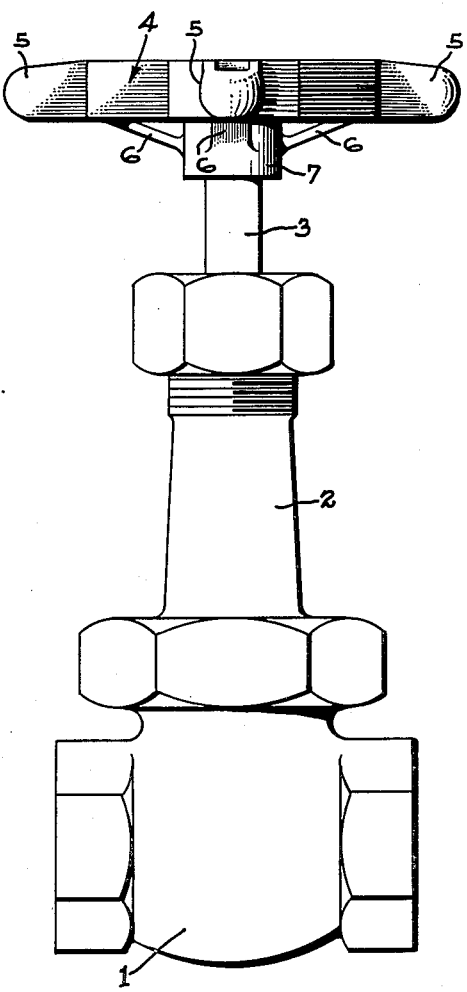
Figure 2 is an elevational view showing a typical valve equipped with a handle of the present invention.

As previously described, a typical valve, for the operation of which the handles of the present invention are intended, comprises a body portion 1, surmounted by a neck 2 which rotatably receives a valve stem 3. Such a valve may either be of globe or gate design, has the usual facilities for connecting pipes to the opposite ends of the body 1, and is provided with the usual stem packing to prevent the escape of fluid. The stem, in usual construction, terminates in a threaded stud surmounting a squared shoulder portion, and the handle, whatever its other configuration, is usually provided with a square recess to fit the squared shoulder portion of the stem, while a nut is threaded onto the end of the stem to hold the handle in place. These details are conventional and, therefore, are not further described.

The handles of the present invention may be of different sizes, depending on the sizes of the valves for which they are intended, but all are characterized by an annular rim 4, which preferably, but not necessarily, is of generally octagonal configuration, as indicated generally at 4, while gripping ears 5 project outwardly from opposed alternate flat portions of the octagonal rim 4. In the construction disclosed, that portion of the handle which is commonly called the "web" portion is constituted by arms 6 which bridge the space between the rim 4 and a central hub 7, through which the valve handle is attached to the valve stem. The hub, as previously indicated, may contain a squared socket bore 8 which fits the squared portion of the valve stem in the usual manner, or the socket may be of serrated or other internal configuration to fit a stem of given shape, as desired.

In outward appearance, as just described, the valve handles of the present invention embody some elements which are characteristic of past structures. However, the particular configuration disclosed herein provides positive operative convenience which has not been accomplished in the past. First, ears 5, projecting laterally from the flats of the rim and spaced apart from one another, receive the fingers of the average workman's hand whether the over-all size of the handle be large or small. This particular configuration in handles for valves of one inch to two inch line size or larger induces the workman to engage the rim with the middle and fourth finger distended between two adjacent ears, for example, ears A and B. When the handle is grasped in this manner, the index finger is naturally disposed adjacent the opposite side of one of the ears, A, so that it projects between the index and middle fingers. Coincidentally, the web of the hand, between the thumb and index finger fits naturally against a preceding ear, e. g. C, of the series, while the remaining ear, D, of the series lodges itself naturally against the palm of the hand. In this manner, the hand is found naturally to grasp the handle at multiple points of contact with the ears, and in doing so, provides high operating torque when the hand is turned or the handle is twisted.

Rim 4 of the hand, in turn, provides an important contribution to the engagement of the handle by the hand in the manner just described. The rim, being of substantial width across opposed flats, keeps the fingers in a spread condition, and thus prevents two adjacent fingers from becoming wedged between adjacent ears, as would occur if the rim were absent, and which experience has taught always does occur in a crossed bar T-type handle of the past. In handles for very small size valves, the fingers may reside between adjacent ears without becoming pinched, even though the handle is too small to permit the palm to fully engage the upper area.

Figure 3:
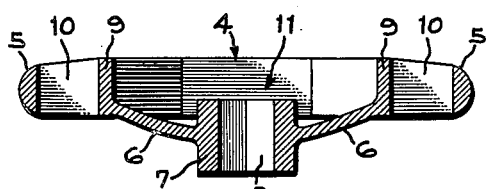
Figure 3 is a cross sectional elevation taken on the line 3—3 of Figure 1.

In the preferred construction, the rim 4 is relatively thin in cross section, as shown at 9 in Figure 3, but is of substantial height to provide a relatively broad surface against which the fingers may find purchase. The octagonal configuration of the rim exterior provides a distinct functional advantage in that V-notches appear adjacent the ears 5 at the terminals of the flat portions of the rim intermediate those flat portions from which the ears project. The fingers adjacent the ears are socketed firmly in the notches to improve the natural grip of the hand upon the handle. However, it is also to be noted in this respect that the sidewise portions of the ears 5 are straight for a distance approximating finger thickness outwardly beyond the rim 4. This flat area enables substantial facial contact of the fingers with the ears and eliminates slippage even when the handle is grasped by a greasy hand or a hand covered with a greasy glove. This feature is of considerable importance in valves employed in packing houses or food processing industries where greasy or slippery substances are prevalent, but where sanitation laws do not permit workmen to wear gloves.

As is shown in Figures 1 and 3, the ears are preferably pierced as at 10 so as to assume the form of metal loops extending outwardly from the rim. This construction provides greater radiation surface from which heat may be dissipated, and hence, helps maintain the valve handle at lower temperature when conditions favor radiation.

While there are instances when a valve may be stuck so tightly that a wrench is actually required to rotate the stem or start its rotatability, still, such instances are quite infrequent and it is generally recognized by operating engineers that the indiscriminate use of a wrench on a valve handle leads only to high maintenance costs. If a valve equipped with a handle of the present invention is actually stuck, then a wrench still may be applied across the handle to bear upon opposite ears. The wrench in such case can be used even more effectively to bear against the ears than if the handle were of scalloped or bulbous contour.

At the web portion of the handle, the arms 6, in the preferred construction, extend inwardly to the hub 7 from the portions of the rim which carry the ears 5 at the rim exterior. As shown best in Figure 3, the arms 6 are connected with the rim at the lower portion thereof, and, in turn, converge downwardly into engagement with the hub. In this manner, the hub 8 is offset from the plane of configuration of the rim to provide a recess indicated generally at 11 at the upper pipe central portion of the handle. This recess serves to house the stem nut (not shown), in such position that the top of the valve stem and stem nut reside below the top plane of the handle, in an out-of-the-way position where they are not engaged by the palm of the hand when the handle is grasped. Arms 6 are relatively thin in cross section, for example, approximating the thickness of the metal of the rim, but the arms are of substantial width, and therefore, effectively withstand the twisting forces which are exerted on the rim.

The valve handles of the present invention may be fabricated by casting or by forging, and in the proportions shown in the drawings weigh less, per unit of force which they are capable of sustaining, than valve handles of the past. It is to be noted that the configuration of the handle, while of functional importance, is relatively simple and regular, and for this reason, fabrication either by casting or by forging is less expensive than in more complicated bulbous or filigree shapes which are characteristic of conventional constructions.

Having described my invention, I claim:

1. A handle for a valve comprising, a central hub configured for attachment to a stem of a valve, a rim of polygonal configuration in outline surrounding the hub, web means interconnecting the rim with the hub, and ears projecting radially outwardly from the rim periphery at points intermediate apexes of the rim polygon, the polygonal configuration of the rim being of such dimensions that the said ears projecting therefrom are spaced apart from one another distances approximating at least the width of two fingers of a hand, and the distance which each ear projects outwardly from the rim approximating at least the thickness of a finger of a hand, the said web means and hub being spaced below the top surface of the said rim providing a recess for receiving the palm of a hand when the fingers are placed across the top of the handle for rotational operation of the handle.

2. A handle for a valve comprising, a rim of substantially octagonal configuration in outline, ears projecting outwardly from opposed alternate flat surfaces of the octagonal rim between apexes of the rim octagon, the said ears having substantially flat sides and being of a length approximating at least the thickness of a finger of a hand, a hub configurated at its central portion for connection to a valve stem, and web means interconnecting the said rim and the said hub and being spaced below the top surface of the said rim so as to provide a recess for receiving the palm of a hand when the fingers are placed over the said rim in operative engagement with the said ears.

3. A handle for a valve comprising, a central hub configurated for attachment to a stem of a valve, an annular rim which is of polygonal outline surrounding the said hub, web means interconnecting the said rim with said hub, the said rim being of substantial height and having radially extending ears projecting outwardly from the rim perimeter at areas residing between apexes of the rim polygon, the rim polygon being of such dimensions that the said ears are spaced apart from one another distances approximating at least the width of two fingers of a hand, and the said web and hub means being spaced below the top surface of the rim so as to provide a recess for receiving the palm of a hand when the fingers of the hand are placed across the rim in operative engagement with the ears.

FREDERICK H. HEHEMANN.

References Cited in the file of this patent

UNITED STATES PATENTS

| Number | Name | Date |
| --- | --- | --- |
| D. 42,770 | Osborne | July 9, 1912 |
| D. 42,855 | Mason | Aug. 6, 1912 |
| D. 80,005 | Wyatt | Nov. 26, 1929 |
| D. 140,256 | Shaeffer | Feb. 6, 1945 |
| 2,076,151 | Kliment | Apr. 6, 1937 |